Figure 1:
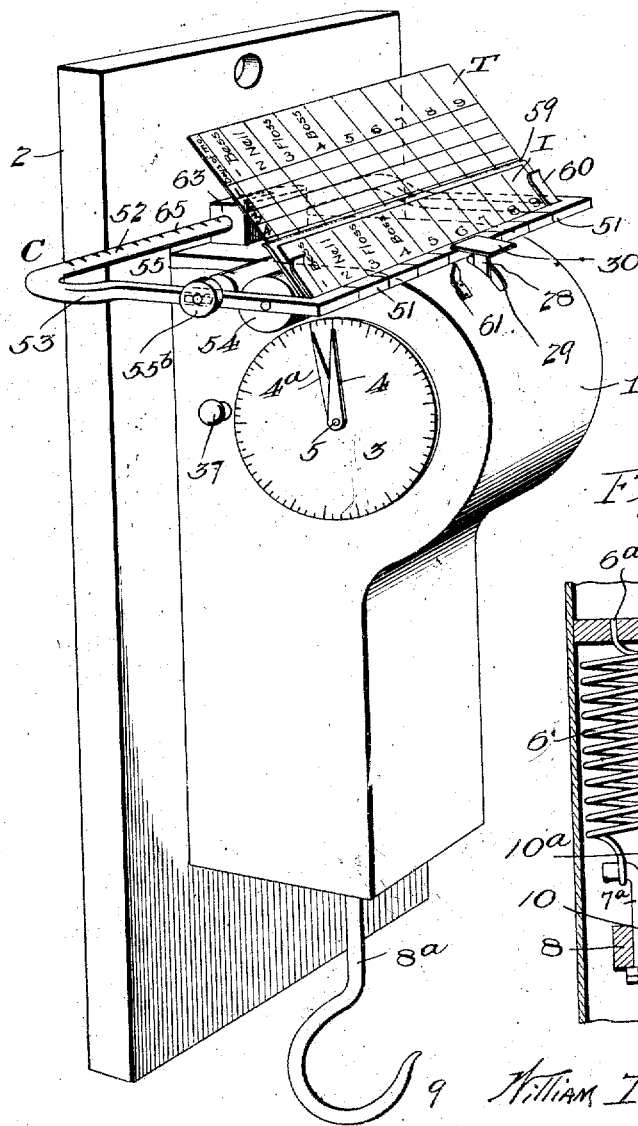

W. T. BOVIE.
RECORDING SCALE.
APPLICATION FILED JAN. 22, 1907.

988,074.

Patented Mar. 28, 1911.
3 SHEETS—SHEET 1.

Witnesses

Inventor
William T. Bovie
By
Attorney

W. T. BOVIE.
RECORDING SCALE.
APPLICATION FILED JAN. 22, 1907.

988,074.

Patented Mar. 28, 1911.
3 SHEETS—SHEET 2.

Witnesses
T. L. Mockase
R. C. Braddock.

Inventor
William T. Bovie

By D. P. Wolhaupter
Attorney

W. T. BOVIE.
RECORDING SCALE.
APPLICATION FILED JAN. 22, 1907.
988,074.
Patented Mar. 28, 1911.
3 SHEETS—SHEET 3.
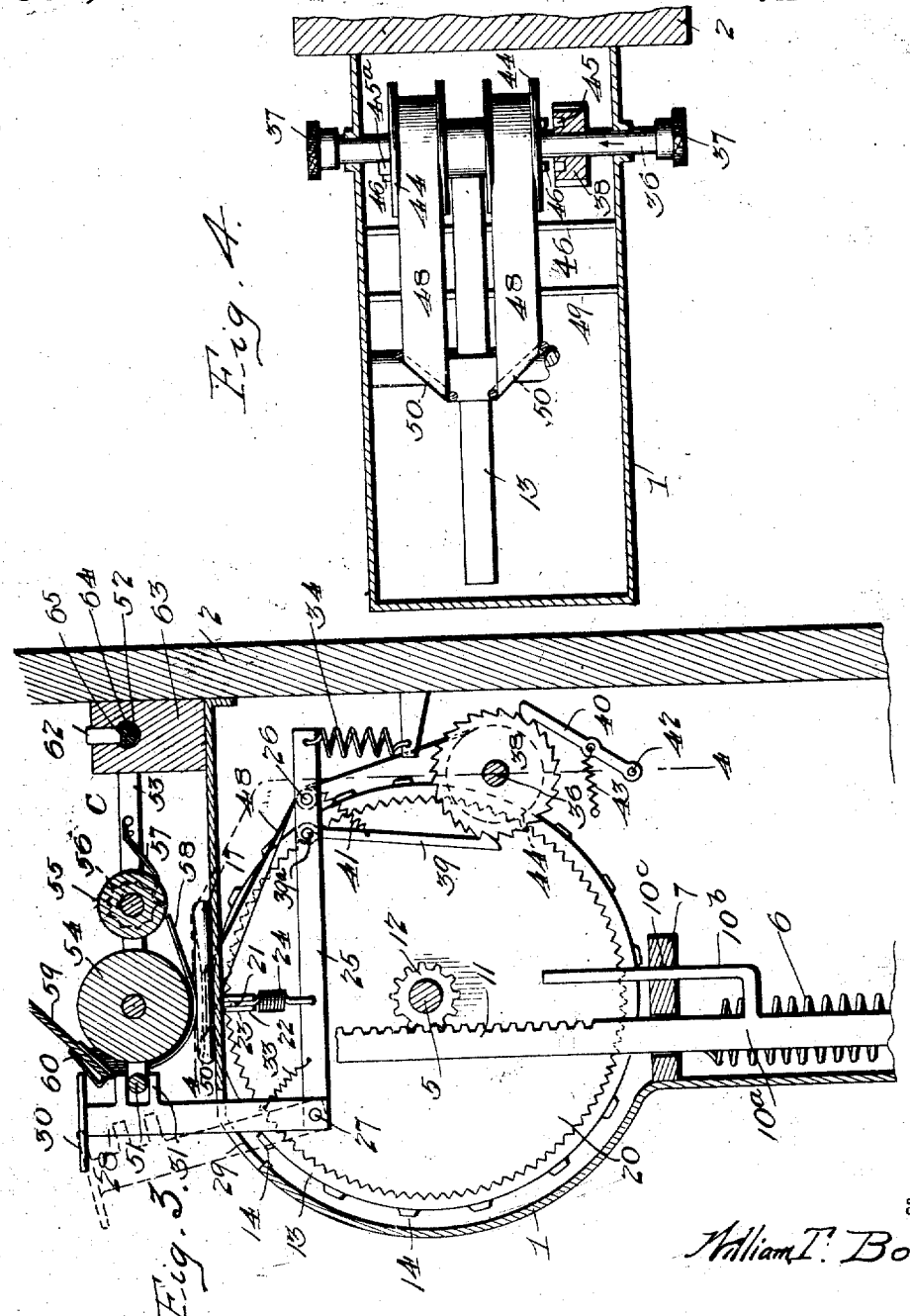
Witnesses
T. L. Mocram
R. C. Braddock.
Inventor
William T. Borie
By
[signature]
Attorney

UNITED STATES PATENT OFFICE.

WILLIAM T. BOVIE, OF AUGUSTA, MICHIGAN, ASSIGNOR OF ONE-HALF TO CARY L. HILL, OF ANN ARBOR, MICHIGAN.

RECORDING-SCALE.

988,074.  Specification of Letters Patent.  Patented Mar. 28, 1911.

Application filed January 22, 1907. Serial No. 353,522.

*To all whom it may concern:*

Be it known that I, WILLIAM T. BOVIE, a citizen of the United States, residing at Augusta, in the county of Kalamazoo and State of Michigan, have invented certain new and useful Improvements in Recording-Scales, of which the following is a specification.

This invention relates to an improved weight recording scale adapted for general purposes wherever a record of the weights is to be made and kept, but possessing special utility as a dairy or creamery scale for the purpose of recording the weights of milk taken from each cow, or sold to each patron. The invention is therefore intended to simplify and systematize the methods in vogue in many dairies and creameries for weighing and making a tally of the milk of each cow or for each patron. Ordinarily, the milk is weighed on a common type of scales and the weight of milk from each cow, or for each patron, is placed on a tally sheet or board, the entries on which are transferred at the end of suitable periods to the proper books, or the totals transferred to such books according to the particular system employed. This rather primitive system is open to many objections, such as the difficulty in keeping the records, the inaccuracies due to carelessness, and also the unavoidable untidiness.

It is the purpose of the present invention to provide a scale embodying means whereby different batches of milk from each cow, or for each patron, can be quickly and accurately weighed, and at the same time a printed record of each weight made mechanically in a proper column on a tally or record sheet, and at the same time carbon copies made of the latter if desired.

With these and many other objects in view which will readily appear as the nature of the invention is better understood, the same consists in the novel construction, combination and arrangements of parts hereinafter more fully described, illustrated and claimed.

The essential features of the invention, and the combinations involved therein, are necessarily applicable to different kinds and types of scales or weighing mechanisms, but for illustrative purposes a practical embodiment of the invention is shown in the accompanying drawings illustrating a dairy scale.

Figure 6:
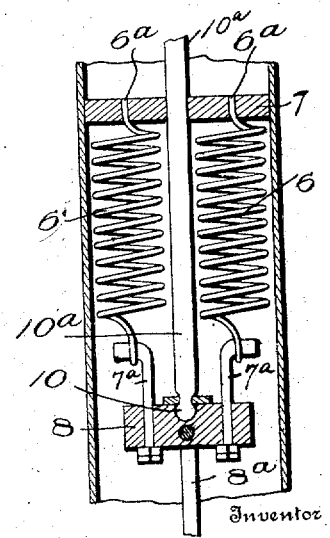
Figure 2:
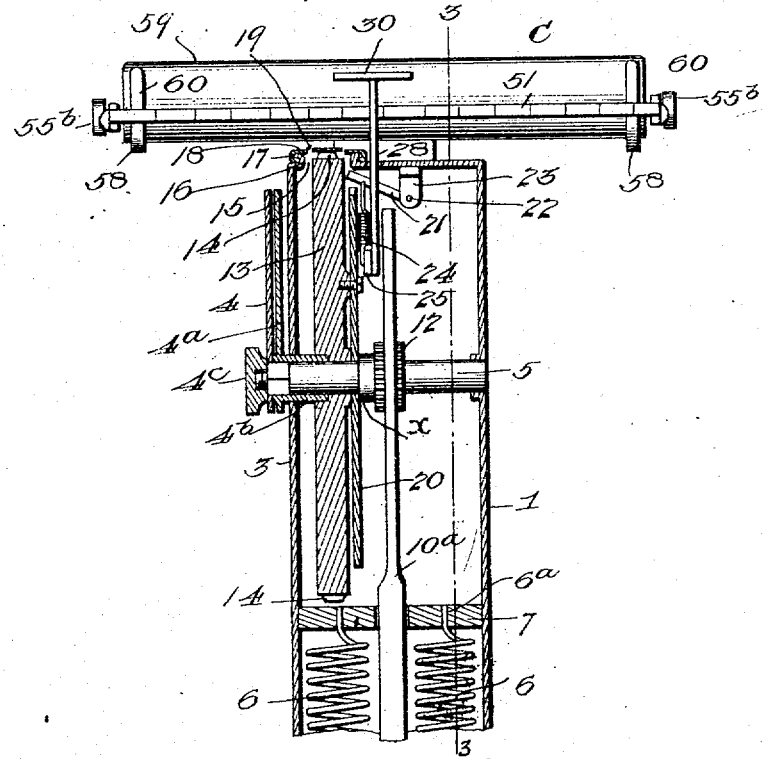
Figure 5:
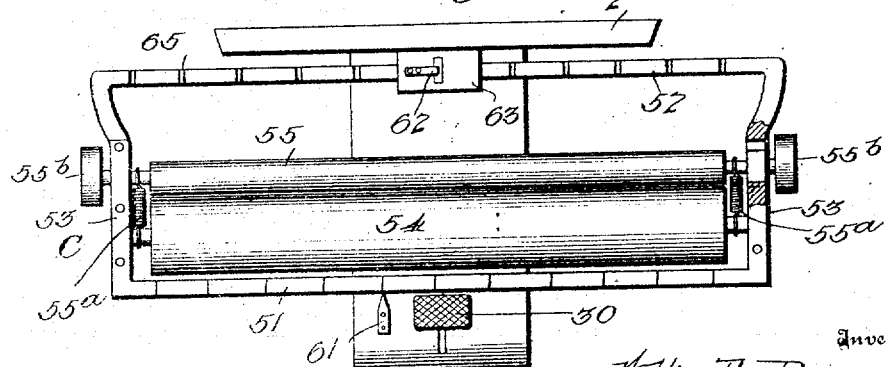

In these drawings,—Figure 1 is a perspective view of a recording scale embodying the present invention. Fig. 2 is a vertical cross-sectional view of the same, the line of section being in front of the record carrier or paper carriage. Fig. 3 is a vertical sectional view on the line 3—3 of Fig. 2. Fig. 4 is a sectional plan view of the ribbon mechanism on substantially the line 4—4 of Fig. 3. Fig. 5 is an enlarged plan view of the record carrier or paper carriage. Fig. 6 is an enlarged detail sectional view of the weighing spring arrangement.

Like references designate corresponding parts in the several figures of the drawings.

As indicated above, the novel combinations involved in the present invention are applicable to different kinds and types of scales or weighing mechanisms, but a compact and practical arrangement of parts is shown in the accompanying drawings wherein is illustrated a weighing mechanism of the spring scale type associated with the printing and other instrumentalities which provide for making a record of each weight weighed by the scale. In this illustration of the invention, which is adapted for use as a dairy scale, the weighing and printing mechanisms are housed in a casing 1 of suitable shape and dimensions and which is preferably secured to a base or supporting board 2, which carries the entire apparatus and is adapted to be hung on the wall or in other positions convenient to the operator. The casing 1 is provided on one of its faces with a circular scale dial 3 graduated to pounds and fractions thereof, and over which is arranged to play a pair of scale hands 4 and 4ª, the latter of which constitutes a tare hand, and subserves the functions of a hand of this character in connection with the gross weight hand 4. This double hand arrangement is common to some types of weighing scales and the functions thereof are well known to provide for determining the allowance or tare, whereby the gross and net weights may be accurately determined, and therefore the double hand arrangement possesses special utility in its application to the present invention which is intended to provide an accurate record of the weights of different batches of milk from each cow, or for each patron, according as the scale is adapted for dairy or creamery use. Both of the hands 4 and 4ª are arranged to be operated from the arbor 5 of the weighing mechanism, but the hand 4 is slidably interlocked with said arbor, while the hand 4ª is carried upon a sleeve 4ᵇ which is loosely mounted upon the arbor and is adapted to be clamped together with the type wheel 13 (hereinafter referred to) fast on the arbor through the medium of the binding nut 4ᶜ mounted upon one extremity of the arbor 5. This binding nut, when tightened, secures both hands and the type-wheel 13 fast upon the arbor for movement therewith, said arbor being journaled transversely of the casing in suitable bearings provided therefor. From the foregoing it will be observed that both the tare hand and the type wheel are mounted on the same sleeve which is movably held on the arbor and forced in the direction of the abutment $x$ upon the tightening of the binding nut 4ᶜ, and said tare hand is so adjusted in relation to the type wheel that it always indicates the number of pounds which will be recorded, and if the binding nut 4ᶜ is loosened the tare hand, together with the type wheel may be given any relative position on the arbor. An empty pail being placed on the scale the gross weight hand is carried over the dial, and the tare hand is then placed at the zero mark, which necessarily brings the type wheel in a position to print 0 pounds. The nut 4ᶜ is then tightened and the sleeve, together with the type wheel, are clamped against the abutment $x$ with the result of making the type wheel and tare hand fast to the arbor. The scale will now print net weights, and at the same time serve as a general purpose scale where gross weights are required. In addition to these elements referred to the weighing mechanism proper includes in its organization the main weighing elements 6 consisting of a pair of coiled weighing springs housed within the casing and secured at their upper ends, as at 6ª, to a fixed abutment or support 7 within the casing, the lower ends of said springs 6 being respectively connected to the opposite holding hooks 7ª bolted or otherwise suitably fitted in the opposite end portions of a cross-head 8. This cross-head 8 has connected thereto the upper end of the stem 8ª of the weight-holding hook 9 located exterior of the casing and adapted to support the receptacle containing the milk to be weighed. The said cross-head 8 also has swiveled thereto, by means of a swiveled connection 10, the lower end of a weight-transmitting rod 10ª having a guiding stem 10ᵇ working through a guide opening 10ᶜ in the fixed abutment or support 7, and also provided with a rack section 11 arranged parallel with the guiding stem 10ᵇ and meshing with a pinion 12 on the arbor 5, thereby providing means for transferring the motion of the rod 10ª to the arbor 5 and hence to the scale hands, with the result of carrying the latter over the face of the dial and indicating the different weights. In regard to the swiveled connection 10 between the lower end of the weight transmitting rod 10ª and the cross head 8 from which the weight holding hook is suspended, it should be noted that the said swiveled connection serves to free said rod 10ª from any strain caused by the springs not working exactly in unison.

The weighing mechanism described has directly associated, and movable, therewith a printing mechanism which includes in its construction a rotating printing type wheel 13 held on the arbor 5 against the abutment $x$ at one side of the same through the medium of the sleeve 4ᵇ, previously referred to, and provided on its periphery with a plurality of raised type characters 14 which are adapted to be exposed in and project through a printing hole 15 provided in the top part of the casing 1 and surrounded by a holding flange 16 with which is interlocked an inturn fastening flange 17 provided about the edge of a type guard plate 18 arranged over the hole 15 and having formed therein a single type opening 19 which exposes to the impression surface (to be presently referred to) for printing, the character or characters corresponding to the weight indicated on the scale 3.

At one side of the type wheel 13 there is arranged what may be termed a centering comb wheel 20 carried with the type wheel and adapted to have its peripheral teeth engaged by a vertically swinging centering knife 21 having a pivotal support at one end as at 22 on a hanger bracket 23 within the casing, and also having a pivotal spring link connection 24 with an intermediate part of a vertically swinging controlling lever 25 pivotally supported intermediate its ends on a transverse supporting rod 26 within the casing.

The vertically swinging controlling lever 25 has pivotally connected to the front end thereof, as at 27, the lower end of an operating bar 28 extending through a clearance opening 29 in the top part of the casing 1 and provided at its upper end with a press-button 30 which is engaged by the fingers of the hand to provide for depressing the bar. The said bar 28 is further provided, exteriorly to the casing 1, with a laterally projecting coupling fork 31 adapted to loosely and detachably engage the front scale bar 51 of the record carrier designated in its entirety by the reference character C, and which will be presently described. The bar 28 has sufficient play in the opening 29 to permit it to be drawn forward out of engagement with the carrier C to the position indicated by dotted lines in Fig. 3, but under working conditions the fork 31 is held in its engaged relation by means of the holding spring 33 connected respectively to the bar 28 and to the lever 25. The latter has connected to the end opposite the bar 28 or end of a return spring 34, the other end of which is connected to a fixed point of attachment within the casing, said spring serving to return the lever 25 and its related connections to normal positions when pressure is released from the operating bar 28. The motion of the lever is utilized not only to draw the knife 21 into engagement with the centering comb wheel 20, but also to actuate the ribbon mechanism which includes in its organization a spool shaft 36 arranged transversely of the casing and provided with the exterior adjusting knobs 37 and with an interior ratchet feed wheel 38, the latter being engaged respectively by the opposite and reversely arranged actuating and check pawls 39 and 40. The pawl 39 has a pivotal connection 39ª with the controlling lever 25 and is held yieldingly engaged with the ratchet wheel by a retracting spring 41, while the pawl 40 is pivotally supported at 42 on a fixed support and is held yieldingly engaged with the ratchet wheel by a retracting spring 43. The check pawl 40 prevents back motion of the wheel 38 during the idle throw of the pawl 39, and the latter when moved in one direction by the lever 25 serves to rotate the spool shaft 36 and hence with it that one of the pair of ribbon spools 44 which is engaged by its clutch connection. The pair of spools 44 are loosely mounted on the spool shaft 36 in spaced relation, and each of the same is provided with a clutch face or clutch element 46 adapted to be respectively engaged by the corresponding clutch elements 45 and 45ª on the shaft 36. This shaft is longitudinally shiftable transversely of the casing and through the medium of the knobs 37 may be readily grasped to provide for clutching or unclutching either of the ribbon spools, according to the direction in which it is necessary to reverse the motion of the ribbon.

The ink ribbon 48 winds and unwinds on the spools 44 and extends therefrom in parallel legs over transverse guides 26 and 49 arranged transversely of the casing in spaced relation, the guide 26 also conveniently serving as the pivot or fulcrum for the lever 25. The outer end portion of the separate parallel legs of the ribbon 48 is folded over a transverse deflecting guide 50 which carries the outer end portion of the ribbon in a transverse direction over the printing hole 15, and hence over the exposed type character or characters on the printing type wheel 13.

The record carrier C which coöperates with the printing mechanism described consists of what may be termed a paper carriage designed to carry the tally sheet upon which the record of weights is made. This carriage essentially comprises a longitudinally and horizontally shiftable frame consisting of the front spacing bar 51, the rear slide bar 52, and the opposite end bars 53 connecting said front and rear bars. This frame has mounted therein a longitudinally arranged cylindrical impression platen 54 providing the impression surface for the printing mechanism and with which platen coöperates a paper feed roll 55, which is yieldingly held in contact with the platen through the medium of the holding springs 55ª which may be conveniently connected respectively with the adjacent spindle extremities of the platen and of said roll. This arrangement provides means whereby the feed roll will positively feed the paper or tally sheets about the platen. The spindle extremities of the feed roll 55 are equipped with turn knobs 55ᵇ, and to provide for regular spacing of the paper there may be fitted to one of the spindles of either the platen 54 or the roll 55, a notched spacing wheel 56 engaged by the free end of a spring dog 57. However any equivalent approved spacing device for determining and holding the line spacing of the work may be employed in connection with the paper carriage or record carrier.

There are associated with the platen 54 suitable paper guides 58 circled beneath the lower side of the platen and serving to guide the paper to the front, and under a front plate 59 in the form of an inclined plate which is preferably equipped with spring or equivalent clips 60 for holding an index card or sheet I which may be used as a guide for positioning the record carrier C. This index card or sheet is usually provided with the same headings and data as the tally sheet T, and the column rulings preferably correspond to the graduations of the front scale bar 51 so that the record carrier can be quickly and accurately positioned for printing the proper weight in the proper column to correspond to the particular cow or patron for which the record is to be made.

The front space bar 51 is provided with graduations with which coöperates a fixed index finger 61 on the machine casing to provide for determining the exact spacing position of the printing in any column on the tally sheet.

To provide for holding the paper carriage in any set position there is employed a spring or equivalent catch 62. This catch may be conveniently mounted on the guide block 63 arranged upon the top of the casing in front of the base or supporting board 2 and provided therein with a guiding opening 64 accommodating the cylindrical bar 52 which is provided with a toothed or notched rack surface 65 engaged by the catch 62. The latter, however, permits the carriage to be slid longitudinally to its adjusted position. When the operating bar 28 is disengaged from the front bar 51 of the carriage frame, the latter can also be swung upwardly upon the bar 52 as an axis to examine or adjust the paper or for other purposes.

In the operation of the apparatus, the action of the weighing mechanism serves to automatically turn the printing type wheel 13 to expose the proper number at the printing hole. The carriage or record carrier is then adjusted to bring the proper column on the tally sheet over the printing point whereupon the operator depresses the operating bar 28 with the result of centering and locking the type wheel by means of the comb wheel and centering knife and at the same time, by reason of the coupling connection 31 of the bar 28 with the record carrier scale bar, depressing the platen with the paper thereon against the ribbon over the type character. This same operation as it is repeated serves to actuate the ribbon mechanism as described.

Various changes in the form, proportion and minor details of construction may be resorted to without departing from or sacrificing any of the advantages of the invention.

I claim—

1. In a recording scale, a weighing mechanism, printing mechanism having a type-carrying element operated by the weighing mechanism, a liftable record carrier arranged wholly exterior to the weighing and printing mechanism, and having an impression surface movable toward and from the type-carrying element and shiftable in relation to the printing mechanism to present any desired part of the record sheet thereon to said mechanism, and operating means for moving the impression surface against the type-carrying element.

2. In a recording scale, a weighing mechanism, printing mechanism having a type-carrying element operated by the weighing mechanism, a shiftable record carrier having an impression surface, a centering and locking device for the type-carrying element, and an operating bar shiftably engaged by the record carrier and arranged to operate said centering and locking device and also to move the impression surface of the carrier against the type-carrying element.

3. In a recording scale, a weighing mechanism, printing mechanism, set to printing position by the weighing mechanism, and an exteriorly arranged liftable record carrier separate from said two mechanisms, but adapted to be moved into operative engagement with the type element of the printing mechanism, said record carrier being shiftable in relation to the printing mechanism to present any desired part of the record sheet thereon to said mechanism.

4. In a recording scale, a casing, weighing and printing mechanism housed within said casing, and a separate liftable hinged record carrier arranged exterior to the casing and having an impression surface coöperating with the printing mechanism and shiftable in relation to the latter to present any desired part of the record sheet to said printing mechanism.

5. In a recording scale, a weighing mechanism, a printing mechanism having a type wheel operated by the weighing mechanism, a centering comb wheel movable with the type wheel, a swinging centering knife coöperating with the comb wheel, a ribbon mechanism having a ratchet feed wheel, a spring returned controlling lever having an operative connection with said centering knife and carrying an actuating pawl for said ratchet feed wheel, a shiftable paper carriage carrying a platen, and an operating bar connected with said controlling lever and also engaged with said carriage for moving the platen against the type wheel.

6. In a recording scale, the combination with a casing having a scale dial, a weighing arbor carrying a scale pointer, a rotary type wheel, a comb wheel and a pinion, a weight transmitting rod having a rack engagement with said pinion, a swinging centering knife coöperating with the comb wheel, a ribbon mechanism having a ratchet feed wheel, a shiftable paper carriage carrying a platen, a spring returned controlling lever connected with said knife and carrying an actuating pawl for said ratchet feed wheel, and a reciprocal operating bar having a detachable clutch connection with the paper carriage, and a spring held connection with said controlling lever.

7. In a recording scale, a weighing mechanism, printing mechanism having a type wheel operated by the weighing mechanism, and a longitudinally shiftable and depressible paper carriage mounted over the weighing and printing mechanisms and carrying paper-holding and feeding means, said paper carriage being also liftable in a vertical direction.

8. In a recording scale, a weighing mechanism, printing mechanism having a type wheel operated by the weighing mechanism, a longitudinally shiftable and depressible paper carriage carrying a platen and paper feeding means, retaining means for holding the carriage in a set position, and means for depressing the carriage with its platen, said carriage being also liftable in a vertical direction.

9. In a recording scale, a casing provided with a printing hole and a type guard covering the same, a weighing mechanism, a printing mechanism having a type wheel exposed through the printing hole, means for operating the type wheel by the weighing mechanism, and a depressible and longitudinally shiftable paper carriage carrying a platen coöperating with said type wheel.

10. In a recording scale, a weighing mechanism, printing mechanism having a type wheel, means for operating the type wheel by the weighing mechanism, and a depressible and shiftable paper carriage coöperating with the printing mechanism and carrying a platen and a front plate having paper clipping elements.

11. In a recording scale, a weighing mechanism, printing mechanism having a type-carrying element operated by the weighing mechanism, a suitably arranged guide block, a shiftable paper carriage frame having a rear slide bar movable through and turning in the block, and a front graduated spacing bar, a fixed index for said front spacing bar, a catch device for the rear slide bar, a platen mounted in the carriage frame, and paper feeding and holding devices coöperating with the platen.

12. In a weight recording scale, a casing, weighing and printing mechanisms partly housed within the casing, and a separate liftable record carrier arranged exterior to the casing and coöperating with the printing mechanism.

13. In a weight recording scale, a weighing mechanism, printing mechanism having a type wheel, means for operating said type wheel by the weighing mechanism, and a depressible and shiftable paper carriage coöperating with said printing mechanism.

14. In a recording scale, a shiftable record carrier, a casing having a dial, weighing and printing mechanism coöperating with said carrier and including an arbor and a type wheel on the arbor, a gross weight hand and a tare hand carried by the arbor, and means for holding the hands in relatively adjusted positions.

15. In a recording scale, a shiftable record carrier, a casing having a dial, weighing and printing mechanism coöperating with said carrier and including an arbor and a type wheel arranged on the arbor, a gross weight hand interlocked with the arbor and working over the dial, and a tare hand loosely mounted upon the arbor and adapted to be clamped to the type wheel.

16. In a recording scale, a shiftable record carrier, a casing having a dial, weighing and printing mechanism coöperating with said carrier and including an arbor and a type wheel arranged on the arbor, and a pair of scale hands, one of which is slidably interlocked with the arbor, and the other of which is loose on the arbor and is adapted to have a clamping connection with the type wheel, and fastening means for securing the two hands fast in their relatively adjusted positions.

17. In a recording scale, a weighing mechanism, a printing mechanism set to printing position by the weighing mechanism, and a shiftable record carrier having paper-holding and guiding means for the tally sheet, and also having separate holding means for retaining in position an index card or sheet.

18. In a recording scale, a weighing mechanism, printing mechanism set to printing position by the weighing mechanism, a shiftable record carrier, a columnated tally sheet arranged to be guided through the record carrier, and a columnated index card or sheet arranged for support on the carrier in a fixed position with relation to the tally sheet.

19. In a recording scale, a weighing mechanism, printing mechanism having a type-carrying element operated by the weighing mechanism, a shiftable record carrier, a centering and locking device for the type-carrying element including a centering knife, a controlling lever, a pivotal spring link connection between said knife and said lever, and an operating bar operatively engaged with the record carrier and with said centering and locking device.

20. In a weight recording scale, a weighing mechanism, printing mechanism including a type-carrying element, means for adjusting said type-carrying element by the weighing mechanism, an impression roll, means for rotating the same, and independent means for shifting and for reciprocating the impression roll relative to the said type-carrying element.

21. In a weight recording scale, a weighing mechanism, printing mechanism having a type-carrying element operated by the weighing mechanism, a shiftable record carrier having an impression surface coöperating with the said type-carrying element, a centering and locking device for the type-carrying element, a ribbon mechanism, and a single operating device for actuating the said centering and locking device, the ribbon mechanism, and for imparting reciprocal movement to the record carrier with respect to the type-carrying element.

In testimony whereof I hereunto affix my signature in the presence of two witnesses.

WILLIAM T. BOVIE.

Witnesses:
H. J. RICHARDSON,
AVIS M. RICHARDSON.